US010017210B2

(12) United States Patent
Drewes et al.

(10) Patent No.: US 10,017,210 B2
(45) Date of Patent: Jul. 10, 2018

(54) SPRING STRUT DOME AND METHOD FOR PRODUCING SAME

(71) Applicant: THYSSENKRUPP STEEL EUROPE AG, Duisburg (DE)

(72) Inventors: Stephan Drewes, Mönchengladbach (DE); Markus Zörnack, Lake Orion, MI (US)

(73) Assignee: THYSSENKRUPP STEEL EUROPE AG, Duisburg (DE)

( * ) Notice: Subject to any disclaimer, the term of this patent is extended or adjusted under 35 U.S.C. 154(b) by 0 days.

(21) Appl. No.: 14/896,088

(22) PCT Filed: Jun. 2, 2014

(86) PCT No.: PCT/EP2014/061388
§ 371 (c)(1),
(2) Date: Dec. 4, 2015

(87) PCT Pub. No.: WO2014/195269
PCT Pub. Date: Dec. 11, 2014

(65) Prior Publication Data
US 2016/0129946 A1    May 12, 2016

(30) Foreign Application Priority Data

Jun. 6, 2013    (DE) .......................... 10 2013 105 867

(51) Int. Cl.
*B62D 25/08*    (2006.01)
*B21K 23/00*    (2006.01)
*B62D 65/02*    (2006.01)

(52) U.S. Cl.
CPC ............ *B62D 25/088* (2013.01); *B21K 23/00* (2013.01); *B62D 65/02* (2013.01)

(58) Field of Classification Search
CPC ...... B21K 23/00; B62D 25/08; B62D 25/082; B62D 25/088
(Continued)

(56) References Cited

U.S. PATENT DOCUMENTS

2004/0216505 A1    11/2004    Knaup
2013/0134742 A1*    5/2013    Mildner ............... B62D 25/088
296/203.02

(Continued)

FOREIGN PATENT DOCUMENTS

CN    1978088 A    6/2007
DE    103 03 184 B3    4/2004
(Continued)

OTHER PUBLICATIONS

German Language International Search Report for International patent application No. PCT/EP2014/061388; dated Nov. 12, 2014.
(Continued)

*Primary Examiner* — Jason S Daniels
(74) *Attorney, Agent, or Firm* — thyssenkrupp North America, Inc.

(57) ABSTRACT

Spring strut domes for use with vehicle bodies can be formed by reshaping a semifinished product into a dome element by way of massive forming. In particular, the semifinished product may be reshaped by rolling, forging, upset-forging, and/or pressing. In this process, structures may be introduced into the dome element that increase the stiffness of the dome element and hence the spring strut dome. Two example structures include ribs and webs, and the dome element may be formed of steel or a steel alloy. In some cases, the semifinished product may be heated before being reshaped into the dome element. Further, the spring strut dome may also include an attaching region coupled to the dome element, which may be used to secure the spring (Continued)

strut dome to a vehicle body. A wall thickness of the attaching region may be equal to or less than 1.5 mm in some examples.

16 Claims, 3 Drawing Sheets

(58) Field of Classification Search
USPC .......................... 296/193.01, 193.09, 203.03
See application file for complete search history.

(56) References Cited

U.S. PATENT DOCUMENTS

| | | | | |
|---|---|---|---|---|
| 2013/0221708 | A1* | 8/2013 | Hanakawa | B62D 25/088 296/193.09 |
| 2015/0314811 | A1* | 11/2015 | Shibata | B62D 25/082 296/193.09 |

FOREIGN PATENT DOCUMENTS

| | | | |
|---|---|---|---|
| DE | 10 2005 043 948 A1 | 4/2007 | |
| DE | 202009000455 U1 | 3/2009 | |
| DE | 10 2011 109 466 A1 | 3/2012 | |
| DE | 10 2012 001 045 A1 | 9/2012 | |
| DE | 102012018693 * | 3/2013 | ........... B62D 25/088 |
| DE | 10 2012 015 149 A1 | 2/2014 | |
| JP | 2010189671 A | 9/2010 | |
| JP | 2013082387 A | 5/2013 | |

OTHER PUBLICATIONS

English translation of International Search Report for International patent application No. PCT/EP2014/061388; dated Nov. 12, 2014.
English language machine translation of DE 20 2009 000 455 U1.
English language Abstract of DE 10 2005 043 948 A1.
English language Abstract of DE 10 2011 109 466 A1.
English language Abstract of DE 10 2012 015 149 A1.
English language Abstract of DE 10 2012 001 045 A1.
English language Abstract of CN1978088A listed above.
Japanese Office Action issued in corresponding application No. JP2016-517258 dated Apr. 3, 2018.

* cited by examiner

US 10,017,210 B2

SPRING STRUT DOME AND METHOD FOR PRODUCING SAME

CROSS REFERENCE TO RELATED APPLICATIONS

This application is a U.S. National Stage Entry of International Patent Application Serial Number PCT/EP2014/061388, filed Jun. 2, 2014, which claims priority to German Patent Application No. DE 02013105867.1 filed Jun. 6, 2013, the entire contents of both of which are incorporated herein by reference.

FIELD

The present disclosure relates to spring strut domes and methods for producing spring strut domes.

BACKGROUND

In order to ensure as low a weight of the component as possible, spring strut domes with complex structures can be produced in casting processes, the spring strut domes preferably consisting of a lightweight metal such as aluminum or an aluminum alloy. One general advantage of the casting process is the freedom of the material distribution both with regard to the wall thickness of the cast workpiece and with regard to the shape of the produced components. In particular, components with complex structures, for example structures which increase the stiffness of the component, can be provided in a manner which meets the loading. However, a component which is produced by means of a casting method also has disadvantages. Surface faults, such as cracks, pores or imperfections, weaken the component and attaching faces have to be post-machined after the casting. Furthermore, cavities can be produced in the interior of the components as a result of a gas cavity during casting, as a result of which the component which is produced has deficient mechanical properties. Internal defects are frequently the cause for fatigue cracks. In addition, air cavities in the material cause problems during the thermal treatment of components. The included gas expands as a result of the heating and forms bubbles, in particular on the component surface, which bubbles likewise reduce the mechanical properties of the component. As an alternative to the production of components by means of casting processes, massive forming of metal sheets is known from the prior art. In the context of the present invention, massive forming is understood to mean chipless reshaping of a semifinished product, a change taking place during the shaping both with regard to the wall thickness and the shape of the cross section of the semifinished product. A semifinished product is to be understood here to possibly be a metal sheet, a plate or else a preshaped part, for example a deep-drawn part. The deep-drawn part can be present in a state which is close to the final geometry or else already in the final geometry. In the case of semifinished products which are close to the final geometry, calibration of the final geometry is carried out by way of the method and, at the same time, structures which increase stiffness are configured, for example ribs, beads and/or other local geometries. In the case of deep-drawn parts with the final geometry, the local structures which increase stiffness are made in a separate step. A method for producing a semifinished product, in particular a plate with a varying wall thickness, is known from DE 103 03 184 B1, for example. Here, the massive forming of components has the advantage that the produced component does not have any internal weak points and is distinguished to this extent by improved mechanical properties. Massive formed parts have, in particular, higher strength and load-bearing capability in comparison with cast parts. Moreover, no material is lost in comparison with conventional machining processes for changing, in particular for reducing, the wall thickness. Laid-open specification DE 10 2012 001 045 A1 has disclosed, for example, a longitudinal carrier which is produced by way of massive forming and which forms a dome element in the region of the spring strut. A spring strut dome of this type is integrated into the vehicle body, with the result that, for example, a replacement of the spring strut dome at the same time necessitates the replacement of the longitudinal carrier.

Spring strut domes of shell design are conventionally used in automotive engineering. In order to conform to the required mechanical properties, material reinforcements are required locally, inter alia, as a result of which, in particular, the number of parts used rises and the joining complexity for connecting the individual shells or deep-drawn parts also increases.

DETAILED DESCRIPTION

Figure 1:
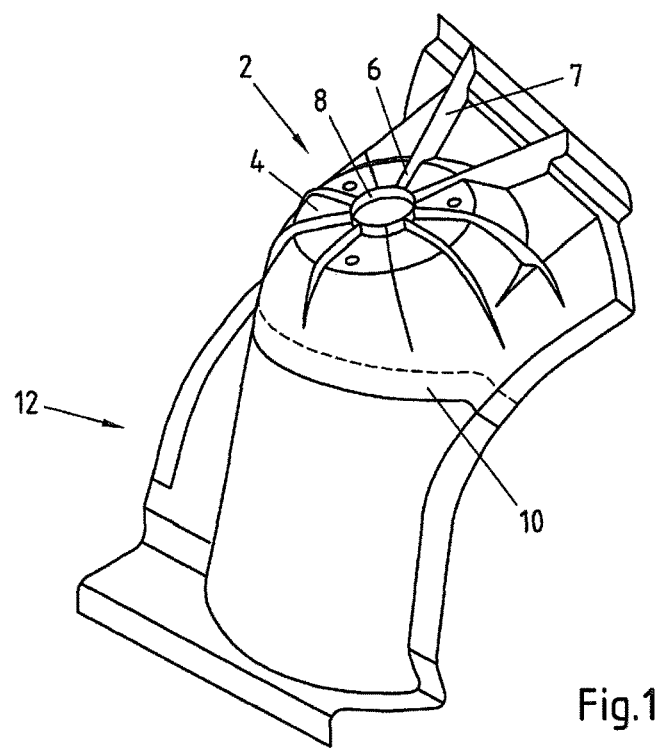
FIG. 1 is a perspective view of an example spring strut dome.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

The present disclosure is based generally on the object of specifying a method, by way of which the process reliability of the production of spring strut domes can be increased and the required mechanical properties of a spring strut dome can be retained with a reduced number of parts and/or reduced wall thickness of the components. Moreover, the invention is based on the object of specifying a spring strut dome and an assembly comprising a spring strut dome and at least one adjoining component, which has the required mechanical properties with a reduced number of parts and/or reduced wall thickness.

According to a first teaching of the present invention, this object is achieved by way of a method for producing a spring strut dome having a dome element as a separate part of the vehicle body, by virtue of the fact that a semifinished product is reshaped to the shape of the dome element by means of massive forming, structures which increase the stiffness additionally being introduced into the dome element by way of the massive forming. It has been discovered that a structure of the spring strut dome which is similar to the casting process and is similarly complex can also be produced by way of massive forming. As a consequence, the spring strut dome has the advantageous properties mentioned at the outset of massive formed components. The susceptibility to faults of the produced spring strut domes can therefore be reduced in comparison with spring strut domes which are produced by means of a casting process, and the process reliability of the producing method can be increased. In addition, according to the invention, additional structures which increase the stiffness of the spring strut dome can be introduced into the dome element by way of the massive forming. Here, the dome element serves to receive the spring strut. As a consequence, the required mechanical properties of the spring strut dome can be ensured with a reduced number of parts and/or reduced wall thickness. Overall, this result can be attributed firstly to the production method by means of massive forming per se and secondly to the presence of additional structures which increase the stiffness.

According to a first refinement of the method according to the invention, regions with an increased wall thickness, in particular ribs or webs, are introduced into the dome element in order to increase the stiffness. Local stresses in the component can be distributed and therefore dissipated as a result of the presence of the regions with an increased wall thickness. Ribs which are arranged in a star-shaped manner around the supporting region of the spring strut are particularly preferably provided. This homogeneous and uniform arrangement of the ribs can ensure an excellent distribution of stresses in the material and therefore high stress dissipation in the material.

In addition, it is also conceivable to provide local thickened material portions which, for example, run around the dome element, in order to increase the stiffness. An increased stiffness of the produced spring strut dome can be achieved, in particular, by way of a combination of different structures.

According to a further, preferred embodiment of the method according to the invention, the semifinished product, for example a plate, has a thickness of, in particular, at least 2 mm, preferably of at least 3 mm. The thickness of the semifinished product corresponds advantageously to the smallest wall thickness of the massive formed component, with the result that merely compression of the wall thickness takes place during the reshaping. In addition, however, it is also conceivable and likewise advantageous if the thickness of the semifinished product corresponds to the greatest wall thickness of the massive formed component, with the result that merely a reduction in the wall thickness takes place during the reshaping. A method is likewise suitable, in which the wall thickness is compressed in regions and is expanded in regions during the reshaping.

The semifinished product is preferably reshaped by way of rolling, forging, upset-forging and/or pressing. Suitable processes for producing spring strut domes are accordingly tension, pressure and/or tension-pressure processes and a combination of at least two suitable processes which make a change in the cross-sectional shape and a reduction and/or increase in the wall thickness of the semifinished product possible.

During the reshaping, the temperature can have a decisive influence on the geometric freedom of the spring strut dome. According to a further preferred refinement of the method according to the invention, the plate is heated before the massive forming, as a result of which the semifinished product can be reshaped more easily. In addition, the semifinished product can also be heated partially, preferably at the locations which are reshaped to a pronounced extent.

The semifinished product, for example the plate, is preferably to be subjected to cold forming, for example reshaping at room temperature, in order to produce the desired shape, for example, of a preform. In one step or further steps, the massive forming takes place on the preform in a targeted manner in the regions, in which structures which increase the stiffness are introduced. Furthermore, during the production of a preform or else during the massive forming, the wall thickness can be reduced in a targeted manner in the regions which serve for attaching to further parts. In order to ensure reliable connection to further components, in particular if conventional welding processes are used, preferably in the case of resistance welding, the wall thickness in the attaching region should be reduced to ≤1.5 mm. This results in the advantages that high dimensional accuracy and particularly high strength of the spring strut domes which are produced can be achieved. Finally, warm forming is also conceivable utilizing a combination of the advantages both of hot forming and cold forming of the plate. Warm forming preferably takes place at a temperature between 400° C. and 650° C.

According to a next preferred embodiment, the semifinished product consists of steel or a steel alloy. HD steels (highly ductile steels) are particularly preferably used. Said steels have very satisfactory reshaping properties with simultaneously high strengths, in particular in the case of cold forming. In addition, tempering steels are also suitable, since they provide particularly high strengths. This list is not comprehensive, however, and the use of further steels or steel alloys for producing spring strut domes is likewise conceivable.

The attachment of the spring strut to the at least one adjoining component preferably takes place by means of an integrally joined connection, preferably by means of welding, particularly preferably by means of resistance welding. In addition to the integrally joined connection, an attachment by means of a positively locking connection is also conceivable.

The adjoining component can be, for example, the longitudinal carrier of the motor vehicle. In addition, a connection to further, preferably deep-drawn components is also conceivable. Furthermore, the properties of the assembly comprising the spring strut dome and the further component can be influenced by way of the specific configuration of the further component.

According to a second teaching of the present invention, the object mentioned at the outset is achieved by way of a spring strut dome having a dome element, in particular produced according to one of the above-described methods, the dome element being configured as a massive formed part, by virtue of the fact that the dome element has structures for increasing the stiffness. As a result of the configuration according to the invention as a massive formed part, the spring strut dome has comparable mechanical properties in comparison with cast components, since the casting faults which were described at the outset can be avoided successfully. In addition, the stiffness of the spring strut dome can be increased by way of the targeted introduction of suitable structures. As a consequence, satisfactory mechanical properties, in particular high strength, stiffness and load-bearing capability, can be ensured by way of a spring strut dome according to the invention on account of its production method and on account of the configuration of the spring strut dome.

The dome element particularly preferably has regions with an increased wall thickness, in particular ribs or webs, in order to increase the stiffness. As a result of the presence of regions with an increased wall thickness, stresses in the material can be distributed and, as a consequence, dissipated, which contributes as a result to higher stiffness of the component. Ribs are preferably provided which are arranged in a star-shaped manner around the support region of the spring strut, with the result that the distribution of stresses in the material can take place particularly uniformly and effectively. It is particularly preferred if the cross section of the ribs increases in the direction of the support region of the spring strut. That region of the spring strut dome which is subjected to particularly high loads can thus be supported specifically. In addition, however, an enlargement of the cross section of the ribs can also be provided in the region of the attachment to further components, with the result that stiffness which is as high as possible can be provided in the attachment region.

In addition to the presence of ribs, it is also conceivable that the dome element has circumferential thickened material portions for increasing the stiffness. In particular, a combination of the two abovementioned structures for increasing the stiffness ensures satisfactory mechanical properties of the spring strut dome.

According to a further preferred refinement of the spring strut dome according to the invention, the dome element consists of steel or a steel alloy. HD or tempering steels are particularly suitable on account of their high strength. However, further steels can also be used for producing a spring strut dome according to the invention.

In order to integrate the spring strut dome into the surrounding vehicle structure, the dome element preferably has attaching regions for connection to further elements of the motor vehicle. Preferably, the connection is provided by way of an integrally joined connection, in particular by way of a welded connection, particularly preferably by way of a connection by means of resistance welding. It goes without saying that other types of connection, for example positively locking connections, to the adjoining vehicle structure are likewise suitable.

According to a third teaching of the present invention, the object mentioned at the outset is achieved by way of an assembly comprising a spring strut dome according to the invention and at least one adjoining component of the motor vehicle, preferably a deep-drawn part. The at least one adjoining component can be configured as a vehicle body part, as a frame part or as a further vehicle structure part.

The properties of the assembly according to the invention can be influenced by way of the configuration of the further component. For example, the stiffness of the further component and therefore the stiffness of the assembly can be increased by way of the provision of suitable structures, in particular depressions, for example in the form of beads or thickened material portions. Moreover, material can be saved by way of the provision of cutouts in the further component.

Figure 2:
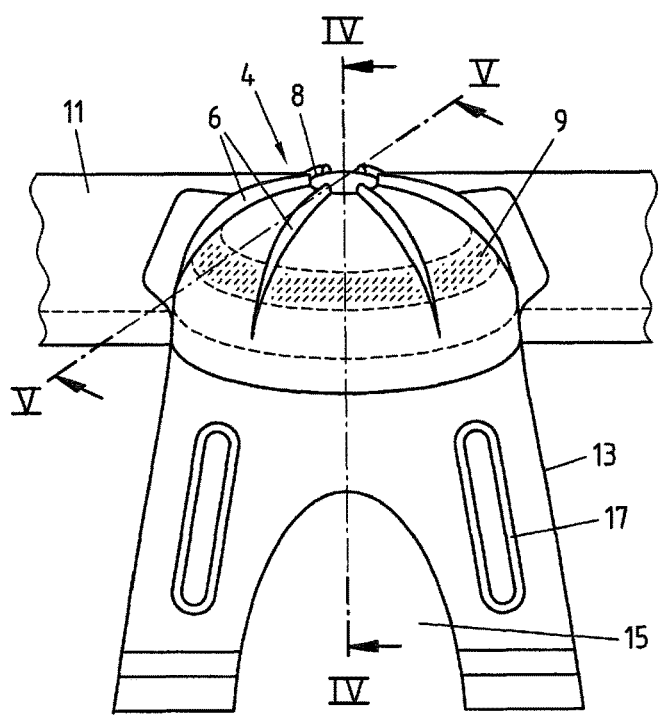
FIG. 2 is a perspective view of an example spring strut dome that is integrated into an adjoining vehicle body structure and includes enlarged star-shaped ribs and an example thickened material portion.

FIG. 1 shows a first exemplary embodiment of the spring strut dome 2 according to the invention having a dome element 4 in a perspective view. According to the invention, the spring strut dome 2 which is shown is produced by way of massive forming, in particular by way of tension, pressure or tension-pressure forming or by way of a combination of at least two suitable reshaping processes. As a consequence, the spring strut dome which is shown in FIG. 2 has comparable properties with a reduced number of parts and/or reduced wall thicknesses in comparison with the spring strut domes known from the prior art. Moreover, the exemplary embodiment shown in FIG. 1 of a spring strut dome according to the invention has ribs 6 for increasing the stiffness of the spring strut dome 2. As a result of the presence of the ribs 6 which are arranged in a star-shaped manner around the support region 8 of the spring strut, stresses in the material can be distributed and therefore dissipated, with the result that, as a consequence, the stiffness of the spring strut dome can be increased. The cross section of the ribs 6 increases in the region of the attachment 7 to a further component, with the result that particularly high stiffness can be ensured in said region and/or the global sheet metal thickness of the component can be reduced. The spring strut dome 2 which is shown consists of steel or a steel alloy, in particular of an HD steel or a tempering steel. Satisfactory deformability can therefore be provided with excellent mechanical properties of the spring strut dome 2 which is produced. The spring strut dome 2 to which is shown in FIG. 1 is connected via attaching regions 10 tend to the adjoining vehicle body 12. Here, the adjoining vehicle body part 12 is configured as a deep-drawn part. A corresponding connection preferably takes place by means of a welding process, in particular by means of resistance welding. The exemplary embodiment which is shown of a spring strut dome according to the invention can accordingly be connected particularly simply to further components and can therefore be integrated into the vehicle structure.

FIG. 2 shows a second exemplary embodiment of a spring strut dome 2 according to the invention having a dome element 4 which is integrated into the adjoining vehicle body structure. The exemplary embodiment which is shown in FIG. 2 of a spring strut dome according to the invention is also produced by means of a massive forming process and has ribs 6 for increasing the stiffness of the spring strut dome 2. The ribs 6 are likewise arranged in a star-shaped manner around the support region 8 of the spring strut. This homogeneous and uniform arrangement of the ribs 6 can ensure optimum stress dissipation in the material. In contrast to the exemplary embodiment which is shown above of the spring strut dome according to the invention, the ribs 6 have an enlarged cross section in the support region of the spring strut. Moreover, the exemplary embodiment which is shown in FIG. 2 additionally has a circumferential thickened material portion 9 which likewise increases the stiffness of the spring strut dome. The spring strut dome is firstly connected to the longitudinal carrier 11 and is secondly connected to a deep-drawn component 13. The deep-drawn part 13 has cutouts 15 for saving material and beads 17 for the purpose of stiffening the deep-drawn part.

Figure 3:
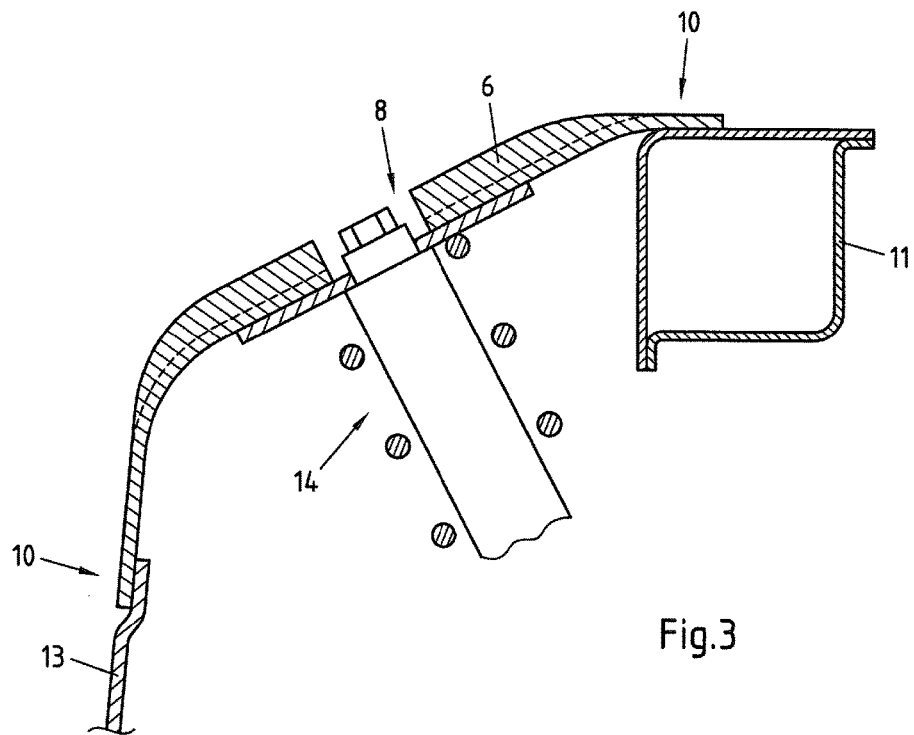
FIG. 3 is a cross-sectional view of the example spring strut dome of FIG. 2 taken across line V-V.

FIG. 3 shows the second exemplary embodiment which is shown in FIG. 2 of the spring strut dome 2 according to the invention in cross section along the cross-sectional line V-V. In the cross section which is shown in FIG. 3, the ribs 6 for increasing the stiffness of the spring strut dome 2 can be seen clearly. In order to provide a distribution of the stress in the material in a manner which meets the loading, the rib cross section increases in the direction of the support region 8 of the spring strut 14. As a consequence, in particular in the region which is subjected to particularly high loading, more material is provided for the stress dissipation, which brings about an increase in the stiffness which meets the loading as a result. In addition, the cross section which is shown in FIG. 3 shows attaching regions 10 for the connection to further elements 12, 11, 13 of the vehicle structure which surrounds the spring strut dome 2. The wall thickness in the attaching regions 10 is preferably reduced to ≤1.5 mm, in order to ensure reliable welding, in particular resistance or laser welding.

Figure 4:
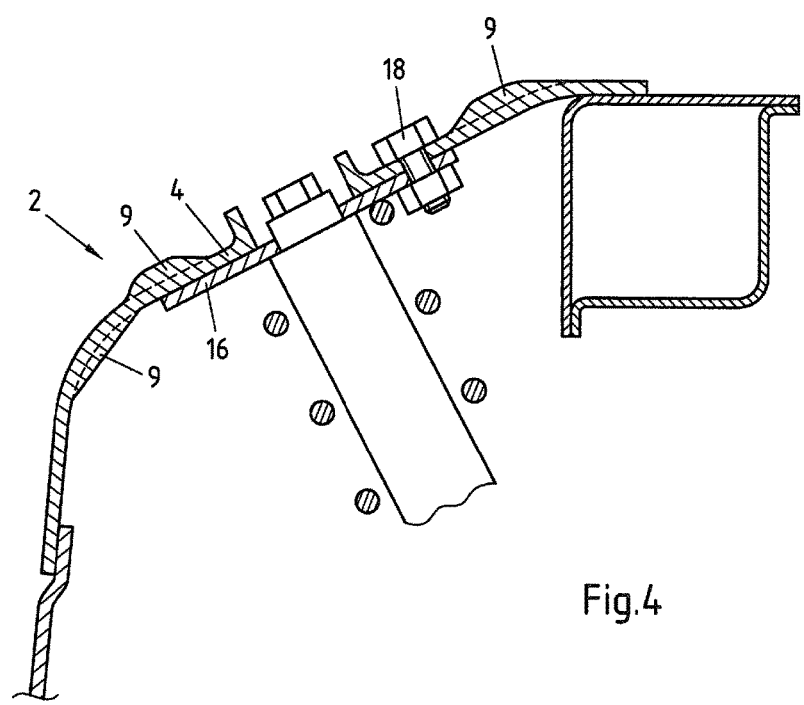
FIG. 4 is a cross-sectional view of the example spring strut dome of FIG. 2 taken across line IV-IV.

FIG. 4 shows the second exemplary embodiment which is shown in FIG. 2 of the spring strut dome 2 according to the invention in cross section along the cross-sectional line IV-IV. In contrast to the cross section which is shown in FIG. 3 along the line V-V, the cross section which is shown does not concern that region of the spring strut dome which has ribs for increasing the stiffness. In contrast, FIG. 4 shows a circumferential thickened material portion 9 for increasing the stiffness. FIG. 4 shows, furthermore, that the spring strut bearing plate 16 of the spring strut 14 is fastened, for example, by means of screws 18 in the regions which do not have any ribs or thickened material portions on the dome element 4 of the spring strut dome 2.

Figure 5:
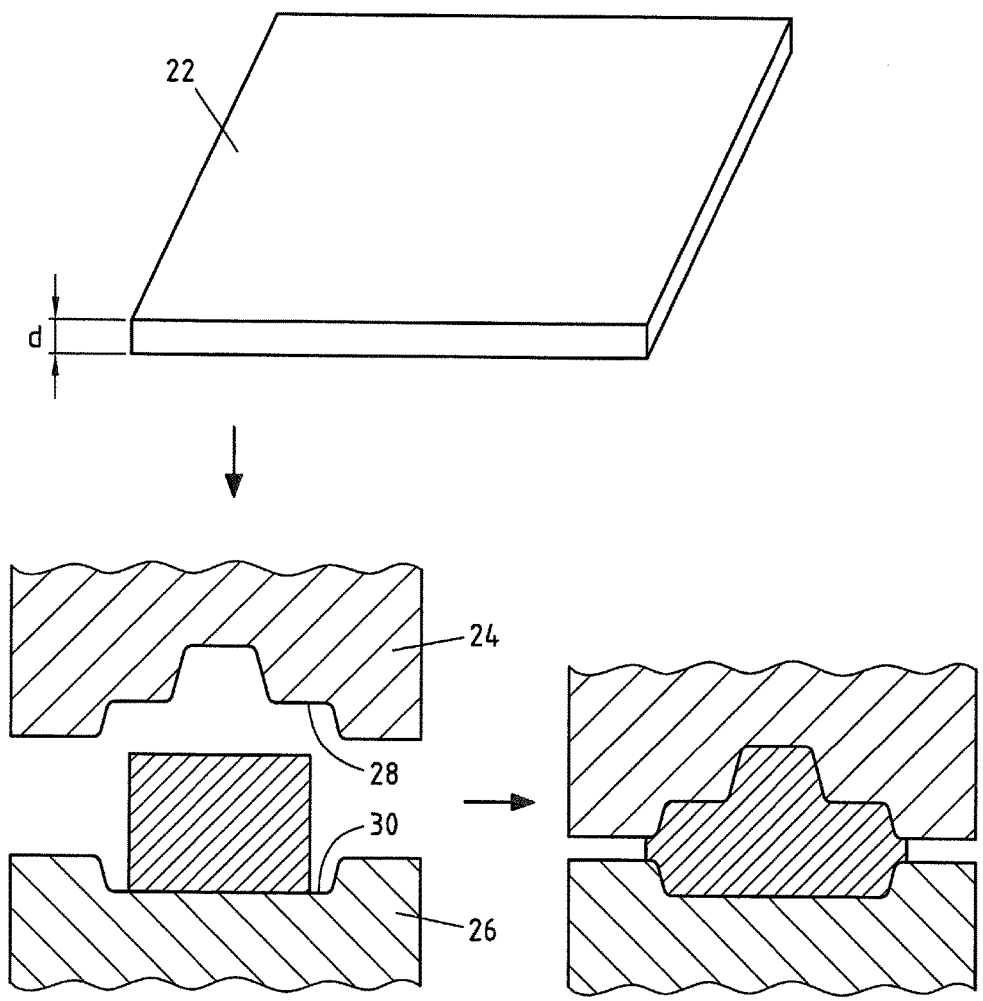
FIG. 5 is a perspective view showing an example method in which an example spring strut dome may be formed in an example die.

FIG. 5 shows a first exemplary embodiment of a method according to the invention for producing a spring strut dome. According to the method which is shown in FIG. 5, the spring strut dome is formed from a plate 22 which has a thickness d of at least 2 mm. In order to produce a spring strut dome, the plate 22 is subjected to massive forming, in the present case die forming. To this end, the plate 22 is moved into a die forge, consisting of an upper die 24 and a lower die 26. The inner contours 28, 30 of the upper die 24 and the lower die 26 correspond to the outer profile of the spring strut dome which is produced. In order to reshape the plate 22, it is first of all inserted into the die forge, the upper die 24 and the lower die 26 being at a spacing from one another which is greater than the thickness of the plate 22. The plate 22 can be heated before the reshaping. The plate material is reshaped into the desired shape by way of the following closure of the two die halves 24 and 26. In this way, a spring strut dome can be produced which has structures of any desired complexity, in particular structures for increasing the stiffness of the spring strut dome, and which, moreover, has the advantageous properties of massive formed components.

What is claimed is:

1. A method for producing a spring strut dome that is securable to a vehicle body, the method comprising:
   reshaping a semifinished product into a dome element by way of massive forming; and
   introducing both a support region to accommodate a spring strut as well as structures that increase stiffness into the dome element by way of massive forming, wherein at least a first one of the structures comprises a region with increased wall thickness, and wherein at least a second one of the structures includes a plurality of vertical strengthening webs extending radially outward from the support region for the spring strut such that the webs are arranged in a star-shaped pattern around a circumference of the support region.

2. A spring strut dome having the dome element produced by the method of claim 1.

3. The spring strut dome of claim 2 wherein the dome element consists of steel or a steel alloy.

4. The method of claim 1 wherein the semifinished product has a thickness of at least 2 mm.

5. The method of claim 1 wherein the semifinished product has a thickness of at least 3 mm.

6. The method of claim 1 wherein the step of reshaping comprises at least one of rolling, forging, upset-forging, or pressing.

7. The method of claim 1 further comprising heating the semifinished product before reshaping the semifinished product by way of massive forming.

8. The method of claim 1 wherein the semifinished product comprises steel or a steel alloy.

9. The method of claim 1 wherein the semifinished product consists of steel or a steel alloy.

10. A spring strut dome having the dome element produced by the method of claim 1, wherein the dome element is configured as a massive formed part.

11. The spring strut dome of claim 10 wherein the dome element consists of steel or a steel alloy.

12. The spring strut dome of claim 10 wherein the dome element comprises attaching regions for connection to one or more components of a motor vehicle.

13. An assembly comprising the spring strut dome of claim 10 and a deep-drawn part of a motor vehicle adjoined to the spring strut dome.

14. A spring strut dome to be secured to a vehicle body, the spring strut dome comprising:
   a dome element comprising steel or a steel alloy, the dome element formed by massive forming;
   a support region disposed at an upper portion of dome element configured to accommodate a spring strut;
   structures disposed in and/or on the dome element that increase stiffness of the dome element, wherein at least a first one of the structures comprises a region with increased wall thickness, and wherein a second one of the structures includes a plurality of vertical strengthening webs extending radially outward from the support region for the spring strut such that the webs are arranged in a star-shaped pattern around a circumference of the support region; and
   an attaching region coupled to the dome element, the attaching region for securing the dome element to the vehicle body.

15. The spring strut dome of claim 14 wherein the attaching region comprises a wall thickness that is less than or equal to 1.5 mm.

16. The spring strut dome of claim 14 wherein the dome element further comprises a circumferential thickened material portion.

* * * * *